US012753307B2

(12) United States Patent
Jang et al.

(10) Patent No.: US 12,753,307 B2
(45) Date of Patent: Oct. 6, 2026

(54) POLYAMIDE COMPOSITE RESIN COMPOSITION HAVING HIGH RIGIDITY AND LOW WATER ABSORPTION AND MOLDED ARTICLE COMPRISING THE SAME

(71) Applicants: HYUNDAI MOTOR COMPANY, Seoul (KR); KIA CORPORATION, Seoul (KR); HDC HYUNDAI ENGINEERING PLASTICS CO., LTD., Dangjin-si (KR)

(72) Inventors: Kyeong Hoon Jang, Seoul (KR); Seul Yi, Seoul (KR); Eun Seob Shin, Yongin-si (KR); Kang Il Jeon, Yongin-si (KR)

(73) Assignees: HYUNDAI MOTOR COMPANY, Seoul (KR); KIA CORPORATION, Seoul (KR); HDC HYUNDAI ENGINEERING PLASTICS CO., LTD., Dangjin-si (KR)

( * ) Notice: Subject to any disclaimer, the term of this patent is extended or adjusted under 35 U.S.C. 154(b) by 683 days.

(21) Appl. No.: 18/202,574

(22) Filed: May 26, 2023

(65) Prior Publication Data

US 2024/0263009 A1 Aug. 8, 2024

(30) Foreign Application Priority Data

Feb. 2, 2023 (KR) ........................ 10-2023-0014237

(51) Int. Cl.

| | |
|---|---|
| ***C08L 77/02*** | (2006.01) |
| ***C08K 3/34*** | (2006.01) |
| ***C08K 5/053*** | (2006.01) |
| ***C08K 5/18*** | (2006.01) |
| ***C08K 7/06*** | (2006.01) |
| ***C08K 7/14*** | (2006.01) |
| ***C08K 9/06*** | (2006.01) |
| ***C08L 23/06*** | (2006.01) |

(52) U.S. Cl.

CPC ................ *C08L 77/02* (2013.01); *C08K 3/34* (2013.01); *C08K 5/053* (2013.01); *C08K 5/18* (2013.01); *C08K 7/06* (2013.01); *C08K 7/14* (2013.01); *C08K 9/06* (2013.01); *C08L 23/06* (2013.01); *C08L 2207/062* (2013.01)

(58) Field of Classification Search

None

See application file for complete search history.

(56) References Cited

U.S. PATENT DOCUMENTS

| | | | | |
|---|---|---|---|---|
| 5,369,182 | A | 11/1994 | Yu et al. | |
| 6,872,459 | B1 | 3/2005 | Frisk et al. | |
| 2010/0069557 | A1* | 3/2010 | Moad | C08L 51/08 524/451 |
| 2016/0362553 | A1* | 12/2016 | Youn | C08L 77/02 |
| 2017/0306126 | A1* | 10/2017 | Miyamoto | C08K 7/06 |

FOREIGN PATENT DOCUMENTS

| | | | | |
|---|---|---|---|---|
| CN | 101987917 | A * | 3/2011 | C08K 3/041 |
| EP | 0514146 | B1 | 11/1997 | |
| JP | H05-194844 | A | 8/1993 | |
| JP | 2005-298639 | A | 10/2005 | |
| KR | 2003-0009392 | A | 1/2003 | |
| KR | 2016-0042766 | A | 4/2016 | |
| KR | 10-1784186 | B1 | 10/2017 | |
| KR | 2021-0005390 | A | 1/2021 | |

OTHER PUBLICATIONS

CN 101987917 translation (Year: 2011).*

* cited by examiner

*Primary Examiner* — Katarzyna I Kolb

(74) *Attorney, Agent, or Firm* — MCDONNELL BOEHNEN HULBERT & BERGHOFF LLP

(57) ABSTRACT

A polyamide composite resin composition has high rigidity and low water absorption by mixing polyamide, a modified aliphatic amine, an inorganic filler, high-density polyethylene and a polyalcohol-based flow improver in appropriate amounts.

10 Claims, No Drawings

POLYAMIDE COMPOSITE RESIN COMPOSITION HAVING HIGH RIGIDITY AND LOW WATER ABSORPTION AND MOLDED ARTICLE COMPRISING THE SAME

CROSS REFERENCE TO RELATED APPLICATIONS

This application claims under 35 U.S.C. § 119(a) the benefit of priority to Korean Patent Application No. 10-2023-0014237 filed on Feb. 2, 2023, the entire contents of which are incorporated herein by reference.

BACKGROUND

(a) Technical Field

The present disclosure relates to a polyamide composite resin composition, and in particular, to a polyamide composite resin composition having high rigidity and low water absorption by mixing polyamide, a modified aliphatic amine, an inorganic filler, high-density polyethylene and a polyalcohol-based flow improver in appropriate amounts, and a molded article including the same.

(b) Background Art

Polyamide is a polymer in which amide (—CONH—) monomers are linked, and is classified depending on the composition of the main chain. As a representative engineering plastic material, the polyamide exhibits high crystallinity and has improved processability, abrasion resistance, chemical resistance, mechanical properties and the like, and is an important material in the field of composite materials.

The polyamide may have properties similar to metals when combined with a high-content inorganic composition, and may be applied to major parts of automobiles. However, a high-content inorganic composition has problems of reducing flowability in an injection process and causing surface defects in injection-molded products.

In view of the above, polyamide composite materials using an inorganic material filler have been actively developed, but the polyamide has problems caused by mechanical property decline and dimensional changes due to a high water absorption rate influenced by the molecular chain structure.

Accordingly, under the background as above, development of composite polyamide materials having improved properties such as high rigidity, low water absorption, light resistance and molding processability when applying a high-content inorganic filler to the polyamide has been required.

SUMMARY

The present disclosure has been made in view of the above, and an object of the present disclosure is to provide a polyamide composite resin composition having high rigidity and low water absorption, and a molded article including the same.

The object of the present disclosure is not limited to the object mentioned above. The object of the present disclosure will become clearer from the following description, and will be realized by means described in the claims and combinations thereof.

A polyamide composite resin composition according to the present disclosure includes 10% by weight to 20% by weight of polyamide, 10% by weight to 20% by weight of a modified aliphatic amine, 50% by weight to 70% by weight of an inorganic filler, 4% by weight to 8% by weight of high-density polyethylene and 1% by weight to 3% by weight of a polyalcohol-based flow improver.

The polyamide may include at least one selected from the group consisting of polyamide 6, polyamide 66, a polyamide 6/66 copolymer, and combinations thereof.

The modified aliphatic amine may include metaxylenediamine.

The inorganic filler may include at least one selected from the group consisting of talc, mica, glass fiber, wollastonite, carbon fiber, and combinations thereof.

The inorganic filler may be surface-treated with a silane-based coupling agent or an epoxy resin.

The high-density polyethylene may have density of 0.930 $g/cm^3$ to 0.980 $g/cm^3$, and a melt index (230° C., 2.16 kg load) of 20 g/10 min to 40 g/10 min. The high-density polyethylene may have a weight average molecular weight of 300,000 g/mol to 700,000 g/mol.

The polyamide composite resin composition may further include 1.5% by weight to 2% by weight of a UV stabilizer and 0.1% by weight to 2% by weight of a master batch.

The UV stabilizer may include at least one selected from the group consisting of HALS (hindered amine light stabilizer) series, UVA (ultraviolet ray absorber) series, and combinations thereof.

The molded article according to the present disclosure includes the polyamide composite resin composition.

The molded article may have a melt flow index (275° C., 2.16 kg load), which is measured in accordance with ASTM D1238, of 4 g/10 min to 14 g/10 min.

The molded article may have a water absorption rate, which is measured at a temperature of 23° C. and relative humidity of 100% in accordance with ISO 62, of less than 2%.

A polyamide composite resin composition according to the present disclosure is effective in obtaining improved mechanical properties such as tensile strength, flexural modulus and impact strength due to a low water absorption rate.

In addition, the polyamide composite resin composition according to the present disclosure has polymer photo/thermal decomposition resistance properties as well as having improved mechanical properties such as tensile strength, flexural modulus and impact strength, and therefore, can be applied to automotive interior parts requiring light resistance and high rigidity.

The effects of the present disclosure are not limited to the effects mentioned above. It should be understood that the effects of the present disclosure include all effects that can be inferred from the following description.

DETAILED DESCRIPTION

The above objects, other objects, features and advantages of the present disclosure will be easily understood through the following preferred embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

In the present specification, terms such as "comprise" or "have" are intended to designate that a feature, number, step, operation, component, part, or combination thereof described in the specification exists, but it should be understood that the terms do not preclude the possibility of the existence or addition of one or more other features, numbers, steps, operations, components, parts, or combinations thereof.

Unless otherwise specified, all numbers, values, and/or expressions expressing quantities of components, reaction conditions, polymer compositions and formulations used in the present specification are approximate values obtained by reflecting various uncertainties of the measurement that arise in obtaining these values among others in which these numbers are essentially different. Therefore, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, such a range includes all integers including from a minimum value to a maximum value including the maximum value, unless otherwise indicated.

A polyamide composite resin composition according to the present disclosure includes 10% by weight to 20% by weight of polyamide, 10% by weight to 20% by weight of a modified aliphatic amine, 50% by weight to 70% by weight of an inorganic filler, 4% by weight to 8% by weight of high-density polyethylene and 1% by weight to 3% by weight of a polyalcohol-based flow improver. Specifically, the polyamide composite resin composition may further include 1.5% by weight to 2% by weight of a UV stabilizer and 0.1% by weight to 2% by weight of a master batch.

Hereinafter, each component of the polyamide composite resin composition according to the present disclosure will be described in more detail as follows.

(A) Polyamide

Polyamide exhibits high crystallinity, and exhibits improved dimensional stability as well as processability, abrasion resistance, chemical resistance and mechanical properties.

The polyamide composite resin composition according to the present disclosure may include the polyamide in an amount of 10% by weight to 20% by weight. When the polyamide content is less than 10% by weight, the amount added is small, and the property enhancing effect may be insignificant. On the other hand, when the polyamide content is greater than 20% by weight, the water absorption rate increases, and thus mechanical properties such as tensile strength and impact strength and molded article dimensions are changed, resulting in quality problems.

Specifically, the polyamide may include at least one selected from the group consisting of polyamide 6, polyamide 66, a polyamide 6/66 copolymer, and combinations thereof. Preferably, polyamide 6 may be used as the polyamide. The polyamide 6 is nylon 6 including diamine and dicarboxylic acid, and has improved mechanical properties, chemical resistance and heat resistance.

(B) Modified Aliphatic Amine

The polyamide composite resin composition may include the modified aliphatic amine in an amount of 10% by weight to 20% by weight.

When the modified aliphatic amine content is less than 10% by weight, the effect of improving gas barrier properties may be weak. On the other hand, when the modified aliphatic amine content is greater than 20% by weight, the content is excessive, causing a problem of increasing a flow index.

Specifically, metaxylenediamine may be used as the modified aliphatic amine. Preferably, metaxylenediamine 6 nylon (m-xylenediamine 6, MXD 6) may be used as the modified aliphatic amine. Compared to general nylon, the metaxylenediamine 6 nylon has an aromatic ring, thereby exhibiting improved gas barrier properties when mixed with the polyamide, and is a material having improved oxygen barrier properties and thermal stability under a humid condition, and having improved moldability.

(C) Inorganic Filler

The inorganic filler is for increasing tensile strength in the present disclosure, and the polyamide composite resin composition may include the inorganic filler in an amount of 50% by weight to 70% by weight. When the inorganic filler content is less than 50% by weight, the property enhancing effect may be insignificant. On the other hand, when the inorganic filler content is greater than 70% by weight, flowability of the polyamide composite resin composition decreases, and hardness increases, resulting in poor sense of touch of a product.

Specifically, the inorganic filler may include at least one selected from the group consisting of talc, mica, glass fiber, wollastonite, carbon fiber and combinations thereof. Preferably, in order to reinforce the inorganic filler in the present disclosure, the inorganic filler may be surface-treated with a silane-based coupling agent or an epoxy resin.

In the present disclosure, by using the inorganic filler in a high content, molding processability may be secured while reducing a water absorption rate and having polymer photo/thermal decomposition resistance properties.

(D) High-Density Polyethylene

The high-density polyethylene is for improving impact strength in the present disclosure, and the polyamide composite resin composition may include the high-density polyethylene in an amount of 4% by weight to 8% by weight. When the high-density polyethylene content is less than 4% by weight, the impact strength improving effect is insignificant, and properties are poor due to water absorption. On the other hand, when the high-density polyethylene content is greater than 8% by weight, mechanical properties such as tensile strength, flexural modulus and impact strength may decline due to decreased flow and reduced mutual binding between the components.

The high-density polyethylene is not particularly limited in the properties, however, the high-density polyethylene may have density of 0.930 g/cm$^3$ to 0.980 g/cm$^3$, and a melt index (230° C., 2.16 kg load) of 20 g/10 min to 40 g/10 min. In addition, the high-density polyethylene has a high molecular weight, and may have a weight average molecular weight of 300,000 g/mol to 700,000 g/mol.

(E) Polyalcohol-Based Flow Improver

The polyalcohol-based flow improver is for minimizing a problem of processability decline resulting from a decrease in the flow caused by the use of the high-density polyethylene resin in the present disclosure.

The polyamide composite resin composition may include the polyalcohol-based flow improver in an amount of 1% by weight to 3% by weight. When the polyalcohol-based flow improver content is less than 1% by weight, the flow improving effect is insignificant. On the other hand, when the polyalcohol-based flow improver content is greater than 3% by weight, emotional quality of the appearance is poor due to gas generation.

Specifically, the flow improver used in the present disclosure is a polyalcohol-based compound and is added in a small amount to the polyamide composite resin composition. In addition, the flow improver may be prepared in a master batch form considering dispersibility of the composite material, and used as an additive performing a role of controlling flowability in the present disclosure.

(F) UV (Ultraviolet) Stabilizer

The UV stabilizer is for protecting the polymer from being exposed to ultraviolet rays and decomposed. The polyamide composite resin composition may include the UV stabilizer in an amount of 1.5% by weight to 2% by weight. When the UV stabilizer content is less than 1.5% by weight, sufficient UV light resistance by the UV stabilizer may not be obtained, and when the UV stabilizer content is greater than 2% by weight, the UV stabilizer is introduced in a too much excessive amount with respect to the polyamide resin, which may decline properties of the polyamide composite resin composition.

Specifically, the UV stabilizer may include at least one selected from the group consisting of HALS (hindered amine light stabilizer) series, UVA (ultraviolet ray absorber) series and combinations thereof.

(G) Master Batch

The master batch is used for enhancing color stability and extrusion process workability in the polyamide composite resin composition. The polyamide composite resin composition may include the master batch in an amount of 0.1% by weight to 2% by weight.

When the master batch content is less than 0.1% by weight, color stability and extrusion process workability may not be achieved. On the other hand, when the master batch content is greater than 2% by weight, properties of the polyamide composite resin composition may decline.

As the master batch, carbon black, dye black or mixtures thereof mixed in ratios and methods known in the art may be used as necessary. Preferably, carbon black may be used.

(H) Additive

The additive is a constitution for providing various functionalities to the polyamide composite resin composition, and as the additive, those commonly used in the art may be used without particular limit within a range that does not impair the effects of the present disclosure.

The additive may include at least one selected from the group consisting of an antioxidant, a lubricant, a heat stabilizer, a plasticizer, a flame retardant, and combinations thereof.

In another aspect, the present disclosure relates to a molded article including the polyamide composite resin composition.

The molded article may be obtained by molding the polyamide composite resin composition using methods such as extrusion molding, injection molding, compression molding, foam injection molding, foam low-pressure injection molding and gas compression molding.

The molded article is not limited in the field of use, but may be applied to molded products in the fields requiring improved surface properties, and properties of light resistance, rigidity and dimensional stability as important properties. For example, the molded article may be preferably applied to automotive parts, mechanical parts, electrical and electronic parts, office equipment such as computers, and parts of miscellaneous goods and the like. Preferably, the molded article may be applied to an injection-molded article of an automotive air vent wing.

The molded article according to the present disclosure may have a melt flow index (275° C., 2.16 kg load), which is measured in accordance with ASTM D1238, of 4 g/10 min to 14 g/10 min.

In addition, the molded article according to the present disclosure may have a water absorption rate, which is measured at a temperature of 23° C. and relative humidity of 100% in accordance with ISO 62, of less than 2%.

Hereinafter, the present disclosure will be described in more detail with reference to specific examples. The following examples are just examples to help understand the present disclosure, and the scope of the present disclosure is not limited thereto.

Example and Comparative Example

Polyamide composite resin compositions were prepared using a common method with components and contents shown in the following Tables 1 and 2.

TABLE 1

| Composition (wt %) | | Example 1 | Example 2 | Example 3 |
|---|---|---|---|---|
| (A) Polyamide | | 15.8 | 14.8 | 13.8 |
| (B) Modified Aliphatic Amine | | 15.8 | 14.8 | 13.8 |
| (C) High-Density Polyethylene | | 4.0 | 6.0 | 8.0 |
| (D) Inorganic Filler | (NON-COATING G/F) | — | — | — |
| | (COATING G/F) | 60.0 | 60.0 | 60.0 |
| (E) Polyalcohol-Based Flow Improver | | 2.0 | 2.0 | 2.0 |
| (F) UV Stabilizer | | 1.5 | 1.5 | 1.5 |
| (G) Master Batch | | 1.0 | 1.0 | 1.0 |

TABLE 2

| Composition (wt %) | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| (A) Polyamide | | 22.8 | 22.8 | 22.5 | 18.8 | 15.0 | 17.8 | 16.8 | 14.8 | 15.8 | 13.8 | 14.8 |
| (B) Modified Aliphatic Amine | | 15.2 | 15.2 | 15.0 | 18.8 | 22.5 | 17.8 | 16.8 | 14.8 | 15.8 | 13.8 | 14.8 |
| (C) High-Density Polyethylene | | — | — | — | — | — | 2.0 | 4.0 | 6.0 | 8.0 | 4.0 | 4.0 |
| (D) Inorganic Filler | (NON-COATING G/F) | 60.0 | — | — | — | — | — | — | — | — | — | — |
| | (COATING G/F) | — | 60.0 | 60.0 | 60.0 | 60.0 | 60.0 | 60.0 | 60.0 | 60.0 | 60.0 | 60.0 |

TABLE 2-continued

| Composition (wt %) | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| (E) Polyalcohol-Based Flow Improver | — | — | — | — | — | — | — | — | — | 6.0 | 4.0 |
| (F) UV Stabilizer | 1.0 | 1.0 | 1.5 | 1.5 | 1.5 | 1.5 | 1.5 | 1.5 | 1.5 | 1.5 | 1.5 |
| (G) Master Batch | 1.0 | 1.0 | 1.0 | 1.0 | 1.0 | 1.0 | 1.0 | 1.0 | 1.0 | 1.0 | 1.0 |

Each Component of Polyamide Composite Resin Composition (A) Polyamide: PA6 (polyamide 6)

(B) Modified aliphatic amine: MXD 6 (m-xylenediamine 6)

(C) High-density polyethylene: HMWPE (high molecular weight polyethylene), weight average molecular weight=300,000 g/mol to 700,000 g/mol, density-0.930 g/cm$^3$ to 0.980 g/cm$^3$, melt index (230° C., 2.16 kg load)=20 g/10 min to 40 g/10 min (D) Inorganic filler: selected from the group consisting of talc, mica, glass fiber, wollastonite, carbon fiber and combinations thereof NON-COATING G/F: not surface-treated COATING G/F: surface-treated with silane-based coupling agent or epoxy resin (E) Polyalcohol-based flow improver: used in master batch form (F) UV stabilizer: selected from the group consisting of OBSERVER, HALS (hindered amine light stabilizer) and combinations thereof (G) Master Batch: Carbon Black

Experimental Example

Subsequently, each of the polyamide composite resin compositions prepared in Examples and Comparative Examples was extruded to a thickness of 58 mm using a twin-screw extruder, and then injected using a 100 TON injection machine manufactured by Fanuc Corporation to be prepared into a specimen for measuring properties.

Then, properties of the prepared specimen were measured using the evaluation method according to the following items. The results are shown in the following Tables 3 and 4.

Evaluation Method (1) Flow index (g/10 min): a melt index of the specimen was measured under the condition of 275° C. and 2.16 kg in accordance with ASTM D1238.

(2) Tensile strength (MPa): tensile strength was measured in accordance with the ISO 527 test method.

(3) Flexural modulus (MPa): flexural modulus was measured in accordance with the ISO 178 test method.

(4) Impact strength (KJ/m$^2$): impact strength was measured in accordance with the ISO 180 test method.

(5) Water absorption rate (%): a water absorption rate was calculated according to the following Equation 1.

$$\text{Water absorption rate}(\%) = |W_1 - W_0| / W_0 \times 100 \quad \text{Equation 1}$$

In Equation 1, $W_0$ is a weight measured after vacuum drying the specimen for 4 hours at 130° C., and $W_1$ is a weight measured after treating the dried specimen for 48 hours at 23° C. and relative humidity (RH) of 100% in a thermo-hygrostat.

(6) Light resistance: light resistance of the specimen was decided as improved, favorable and poor with the naked eye using an MS210-05 apparatus under the condition of 89±3° C., 50±5% RH and 126 MJ/m$^2$ exposure (65.5 W/m$^{2*}$530 hr).

(7) Emotional quality: for the specimen, appearance of the surface was observed with the naked eye using a microscope of ×1000, and improved, favorable and poor were decided.

TABLE 3

| Evaluation Item (Properties) | Example 1 | Example 2 | Example 3 |
|---|---|---|---|
| Flow Index (g/10 min) | 14 | 8 | 4 |
| Tensile Strength (MPa) | 238 | 234 | 212 |
| Flexural Modulus (MPa) | 20,855 | 20,147 | 19,889 |
| Impact Strength (KJ/m$^2$) | 15.2 | 15.8 | 16.2 |
| Water Absorption Rate (23° C., Relative Humidity 100%) | 1.66 | 1.62 | 1.58 |
| Light Resistance (Polymer Photo/Thermal Decomposition) | Excellent | Excellent | Excellent |
| Emotional Quality (Appearance) | Excellent | Favorable | Poor |

TABLE 4

| Evaluation Item (Properties) | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Flow Index (g/10 min) | 20 | 22 | 21 | 19 | 16 | 8 | 6 | 5 | 2 | 27 | 21 |
| Tensile Strength (MPa) | 221 | 233 | 234 | 237 | 261 | 235 | 232 | 229 | 216 | 233 | 235 |

TABLE 4-continued

| Evaluation Item (Properties) | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Flexural Modulus (MPa) | 20,346 | 21,116 | 21,105 | 21,984 | 21,515 | 20,845 | 20,832 | 20,342 | 20,158 | 20,548 | 20,654 |
| Impact Strength ($KJ/m^2$) | 12.8 | 14.4 | 14.2 | 14.6 | 15.7 | 15.3 | 17.5 | 17.6 | 18.3 | 14.4 | 14.7 |
| Water Absorption Rate (23° C., Relative Humidity 100%) | 4.89 | 4.92 | 4.89 | 1.83 | 1.69 | 1.78 | 1.73 | 1.71 | 1.71 | 1.62 | 1.63 |
| Light Resistance (PolymerPhoto/ Thermal Decomposition) | Poor | Poor | Excellent | Excellent | Excellent | Excellent | Excellent | Excellent | Excellent | Excellent | Excellent |
| Emotional Quality (Appearance) | Favorable | Favorable | Favorable | Favorable | Favorable | Favorable | Poor | Poor | Poor | Poor | Favorable |

Referring to the results of Table 4, Comparative Examples 1 to 3 using greater than 20% by weight of the polyamide without using the high-density polyethylene and the polyalcohol-based flow improver had relatively low impact strength compared to Examples. Comparative Example 1 using the inorganic filler with no surface treatment exhibited the poorest impact strength.

Comparative Examples 2 and 3 not using the high-density polyethylene and the polyalcohol-based flow improver had a very low water absorption rate compared to Examples.

Comparative Example 2 using less than 1.5% by weight of the UV stabilizer had poor light resistance.

Comparative Example 4 not using the high-density polyethylene and the polyalcohol-based flow improver had relatively low impact strength compared to Examples.

Comparative Example 5 using greater than 20% by weight of the modified aliphatic amine and Comparative Example 6 using less than 4% by weight of the high-density polyethylene had a relatively high flow index compared to Examples.

It was identified that Comparative Examples 7 to 9 not using the polyalcohol-based flow improver had poor emotional quality compared to Examples.

It was identified that Comparative Examples 10 and 11 using greater than 3% by weight of the polyalcohol-based flow improver had a flow index significantly increasing.

On the other hand, referring to the results of Table 3, it was seen that, in Examples 1 to 3 using 10% by weight to 20% by weight of the polyamide, 10% by weight to 20% by weight of the modified aliphatic amine, 50% by weight to 70% by weight of the inorganic filler, 4% by weight to 8% by weight of the high-density polyethylene, 1% by weight to 3% by weight of the polyalcohol-based flow improver, 1.5% by weight to 2% by weight of the UV stabilizer and 0.1% by weight to 2% by weight of the master batch, each component was mixed in an appropriate amount, and improved quality was obtained with all properties corresponding to, not only a water absorption rate but also a flow index, tensile strength, flexural modulus, impact strength, light resistance and emotional quality being in a balanced state.

Accordingly, by having each component mixed in an appropriate amount, the polyamide composite resin composition according to the present disclosure is effective in obtaining improved mechanical properties such as tensile strength, flexural modulus and impact strength due to a low water absorption rate.

In addition, the polyamide composite resin composition according to the present disclosure has improved mechanical properties and polymer photo/thermal decomposition resistance properties, and therefore, may be applied to automotive interior parts requiring properties of light resistance and high rigidity.

Hereinbefore, embodiments of the present disclosure have been described, however, those skilled in the art will understand that the present disclosure may be implemented in other specific forms without changing the technical ideas or essential features. Therefore, it should be understood that the embodiments described above are illustrative in all aspects and not restrictive.

The invention claimed is:

1. A polyamide composite resin composition comprising:

10% by weight to 20% by weight of polyamide;

10% by weight to 20% by weight of a modified aliphatic amine;

50% by weight to 70% by weight of an inorganic filler;

4% by weight to 8% by weight of high-density polyethylene; and

1% by weight to 3% by weight of a polyalcohol-based flow improver, wherein the high-density polyethylene has a weight average molecular weight of 300,000 g/mol to 700,000 g/mol, density of 0.930 $g/cm^3$ to 0.980 $g/cm^3$, and a melt index (230° C., 2.16 kg load) of 20 g/10 min to 40 g/10 min.

2. The composition of claim 1, wherein the polyamide comprises at least one selected from the group consisting of polyamide 6, polyamide 66, a polyamide 6/66 copolymer, and combinations thereof.

3. The composition of claim 1, wherein the modified aliphatic amine comprises metaxylenediamine.

4. The composition of claim 1, wherein the inorganic filler comprises at least one selected from the group consisting of talc, mica, glass fiber, wollastonite, carbon fiber, and combinations thereof.

5. The composition of claim 1, wherein the inorganic filler is surface-treated with a silane-based coupling agent or an epoxy resin.

6. The composition of claim 1, further comprising:

1.5% by weight to 2% by weight of a UV stabilizer; and 0.1% by weight to 2% by weight of a master batch, wherein the master batch comprises carbon black, dye black, or mixtures thereof.

7. The composition of claim 1, wherein the UV stabilizer comprises a HALS (hindered amine light stabilizer).

8. The composition of claim 1, having a melt flow index (275° C., 2.16 kg load), measured in accordance with ASTM D1238, of 4 g/10 min to 14 g/10 min.

9. A molded article comprising the polyamide composite resin composition of claim 8.

10. The molded article of claim 9, having a water absorption rate, measured at a temperature of 23° C. and relative humidity of 100% in accordance with ISO 62, of less than 2%.

* * * * *